United States Patent [19]

Burns

[11] 4,388,756

[45] Jun. 21, 1983

[54] METHODS OF MAKING IMPROVED ROTOR ASSEMBLY

[75] Inventor: Richard D. Burns, Holland, Mich.

[73] Assignee: General Electric Company, Fort Wayne, Ind.

[21] Appl. No.: 210,309

[22] Filed: Nov. 25, 1980

Related U.S. Application Data

[62] Division of Ser. No. 954,663, Oct. 25, 1978, Pat. No. 4,271,368.

[51] Int. Cl.³ ............................................ H02K 15/14
[52] U.S. Cl. ....................................... 29/598; 29/416; 310/42
[58] Field of Search ................. 29/596, 598, 416, 418; 310/42, 51, 58, 89, 261; 174/65 R

[56] References Cited

U.S. PATENT DOCUMENTS

| | | |
|---|---|---|
| 317,789 | 5/1885 | Horton .................................... 83/108 |
| 1,039,722 | 10/1912 | Fullman .................................. 29/416 |
| 1,509,737 | 9/1924 | McCleary . |
| 2,089,626 | 8/1937 | Smith . |
| 2,744,202 | 5/1956 | Horvath et al. ....................... 310/71 |
| 2,875,694 | 3/1959 | Carter . |
| 2,993,386 | 7/1961 | McClendon . |
| 3,067,690 | 12/1962 | Kramer et al. . |
| 3,313,968 | 4/1967 | Kaiser ................................... 310/258 |
| 3,321,654 | 5/1967 | Allendorph .......................... 310/258 |
| 3,518,467 | 6/1970 | Wightman ............................. 310/63 |
| 3,584,980 | 6/1971 | Cawley et al. . |
| 3,614,384 | 10/1971 | Heitchue . |
| 3,663,127 | 5/1972 | Cheers . |
| 3,664,461 | 5/1972 | Leffers et al. . |
| 3,965,382 | 6/1976 | McCroskey et al. ............... 310/261 |
| 4,091,638 | 5/1978 | Mitch . |
| 4,103,101 | 7/1978 | Maier .................................. 174/65 R |
| 4,132,912 | 1/1979 | Wright ................................... 310/62 |

Primary Examiner—Carl E. Hall
Assistant Examiner—P. W. Echols
Attorney, Agent, or Firm—Ralph E. Krisher, Jr.

[57] ABSTRACT

This patent discloses a method of manufacturing rotors particularly adapted for use in hermetically sealed motor-compressor units of the type to be utilized for refrigeration applications. Previously known standard manufacturing steps are followed in producing a rotor having counterweights at one end thereof secured to the rotor by any suitable fastening means. Practice of the present invention results in rotors that include a shroud overlying the counterweights. In the manufacture of the shroud itself, I locate a centrally disposed region and define such region by piercing the shroud material along a major portion of its perimeter, but retain at least two tabs or ears which interconnect the centrally disposed portion of the shroud with the remainder of the shroud. The resulting shroud preferably has a centrally disposed portion which then may be separated from the remainder of the shroud by fracturing the interconnecting tabs in order to expose the rotor shaft.

Thereafter, the shaft may be pressed out of the rotor, and the central portion of the shroud retained. Subsequently, the central portion of the shroud is relocated on the remainder of the shroud, pressed into position, and refastened by any suitable means, such as, but not limited to, spot welds, silver solder, brazing, etc. The rotor having a reassembled shroud then is usable in a reassembled compressor.

3 Claims, 8 Drawing Figures

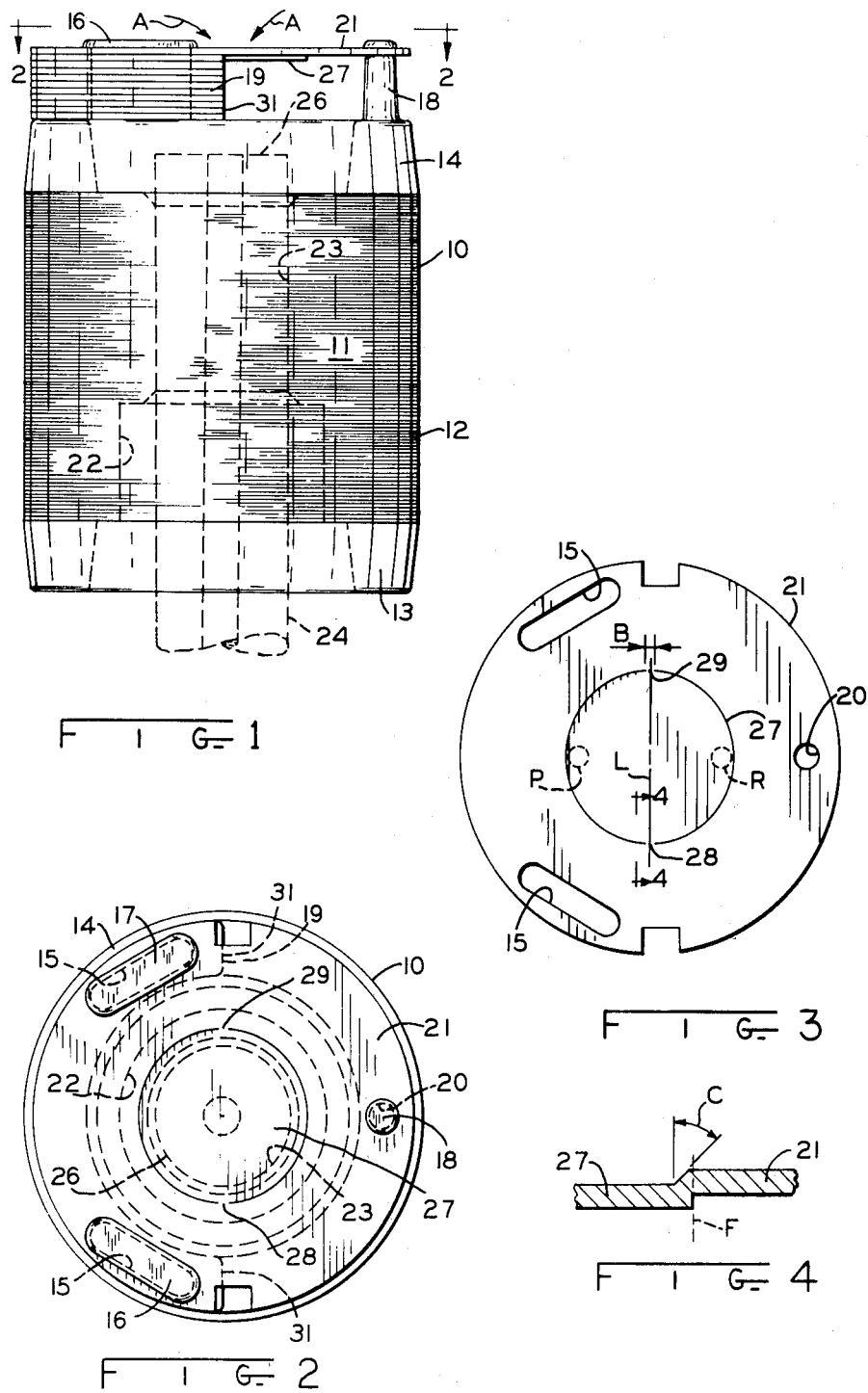

METHODS OF MAKING IMPROVED ROTOR ASSEMBLY

CROSS REFERENCE TO RELATED APPLICATIONS

This application is a division of co-pending application Ser. No. 954,663 which was filed Oct. 25, 1978 and which issued as U.S. Pat. No. 4,271,368 on June 2, 1981; and the entire disclosure of which is incorporated herein by reference.

BACKGROUND OF THE INVENTION

The present invention relates generally to dynamoelectric machines, and, more particularly, to methods of making improved rotor structures which are hermetically sealed within an assembly such as a refrigeration compressor.

In refrigeration compressors of the hermetically sealed type, stators and rotors which comprise electric motor parts are mounted so as to operatively drive a shaft which is connected to a compressor mechanism. Such compressor mechanism may be of the reciprocating piston type as shown, for example, in Cheers U.S. Pat. No. 3,663,127 which issued May 16, 1972. On the other hand, such compressor units may be of the type known in the industry as rotary compressors. In many such compressors, the shaft itself is hollow and such an arrangement is illustrated in the above-referenced Cheers U.S. Pat. No. 3,663,127. An axially extending hole in the shaft may be utilized for numerous different functions. Typically, for example, the hole may be utilized to provide a passage through which lubricating oil may pass and thence be circulated from one end of the shaft to another. This type of arrangement is illustrated and discussed in some detail in the above-referenced Cheers patent. As will be understood by persons skilled in the art, rotors used in these types of applications usually are provided with rivets or other fastening means which are utilized to secure counterbalance weights. The counterbalance weights then provide the function of counterbalancing unbalances in the rotor structure per se, and/or unbalances associated with masses that are attached to the rotor shaft. One such mass may, for example, be a crankshaft and one or more pistons (along with connecting structure therefor) which are attached to the crankshaft. Counterbalance weights and methods of attaching the same are illustrated and described in McCroskey at al U.S. Pat. No. 3,965,382 which issued June 22, 1976 (as well as in the above-referenced Cheers patent).

Prior to the present invention, others have suggested and presumably used in commercial practice, shrouds which were attached to the top of the rivets or other fastening means that were provided to hold balance weights in place on the rotor structure. These shrouds, known by others prior to the present invention, were intended to give support to exceptionally heavy counterweights on the rotor. In addition, the shrouds that were suggested by others would serve an additional desirable function of deflecting refrigerant gas in the area of the shroud. It apparently has been concluded that it would be desirable to prevent any high pressure gas within the compressor unit from being directed axially downwardly along the rotor shaft.

Carter U.S. Pat. No. 2,875,694 which issued Mar. 3, 1959 illustrates an end closure plate disposed above the end of a hollow rotor shaft. Even though Carter relates to an art generally nonanalogous to the hermetically sealed refrigerator compressor art, a review of the structure shown by Carter will be helpful to an understanding of the relationships of parts that have been described hereinabove. Still other patents in nonanalogous arts are broadly addressed to methods of attaching counterweights. One such patent, for example, is McClendon U.S. Pat. No. 2,993,386 which is related to the nonanalogous art of mounting balance weights to motor vehicle brake drums.

Other patents of which I am aware that generally illustrate hermetically sealed refrigeration compressor motor parts are Smith U.S. Pat. No. 2,089,626 of Aug. 10, 1937; Hurst et al U.S. Pat. No. 3,584,980 of June 15, 1971; Heitchue U.S. Pat. No. 3,614,384 which issued Oct. 19, 1971; Leffers et al U.S. Pat. No. 3,664,461 which issued May 23, 1972; and Mitch U.S. Pat. No. 4,091,638 which issued May 30, 1978.

Of the above patents, the 1937 patent of Smith illustrates generally the type of apparatus referred to hereinabove (including balance weights). The Hurst et al patent clearly illustrates a piston type compressor utilizing a rotor shaft having oil pumping passages therein; and the Heitchue patent illustrates a piston type compressor having a piston attached to the upper end of the rotor shaft. The Leffers et al patent, on the other hand, describes in some detail the lubricating arrangements for hermetically sealed compressor motor parts; while the Mitch patent is concerned with cooling of hermetically sealed compressor motor parts. The Mitch patent is also of interest at least to the extent that it illustrates a cap member denoted by the numeral 72 in the Mitch patent which extends above the drive shaft of the compressor and seals off the shaft which is provided with oil passages.

As indicated hereinabove, prior to the present invention others have suggested the use of shrouds that would both structurally reinforce rotor structures having exceptionally heavy counterweights as a part thereof, and that would deflect gas in the area of the end of the rotor. Work performed by others utilizing such arrangements identified new problems associated with such shroud usage. More specifically, it was found that for one reason or another it might, on occasion, be desirable to disassemble the motor parts of a given compressor wherein a shroud had been utilized.

The actual assembly of motor parts in a compressor usually involves press fitting a rotor body onto a shaft; and disassembly of such parts requires that the end of the shaft be accessible for tools and fixtures which are to be utilized to press the shaft back out of the rotor. However, when shrouds are provided at the end of the shaft, the shaft end becomes inaccessible. As a solution to this problem, others have suggested that the shroud be provided with a hole in the center thereof which would permit access to the end of the rotor shaft in the event that it was desired to press the shaft out of the rotor. This suggested solution however was not fully satisfactory for the reason that gases within the compressor would then have access to the end of the shaft and the interior of the rotor through the centrally disposed opening in the shroud.

Still another suggestion or remedy for correcting the exposed shaft and shaft accessibility problems involved the suggestion of providing spring loaded closure plugs which would be snapped into a hole in the center of a rotor shroud. It has been thought, however, that such an arrangement would be unsatisfactory since the spring loaded plugs could contribute to vibration, and/or might in fact be dislodged during motor operation. To simplify the disclosure that is presented herein, and which was conceived against the background of all of the preceding description; it is now noted that the entire disclosures of all of the above cited patents are incorporated herein by reference—with the exception of any patents that have been specifically indicated to be directed to nonanalogous subject matter.

It should now be understood that it would be desirable to provide a method of manufacturing a rotor for a hermetically sealed compressor wherein the rotor includes a shroud disposed to cover the end of a shaft subsequently assembled with the rotor. More specifically, it would be desirable that such shroud be closed in the central portion thereof to prevent exposure of the end of the shaft to gases in that area. In addition, it would be desirable that the shroud be devised such that the rotor could be disassembled from the shaft by pressing against the end of the shaft under the shroud without destroying the usefulness of the rotor in a subsequently reassembled compressor. Moreover, it would be desirable to provide methods of making new and improved rotor constructions whereby the rotor structure, including the shroud supplied therewith, would be completely reusable in a reassembled compressor environment with the shroud protecting the end of the shaft from gases being directed thereon and all without requiring the use of auxiliary caps or plugs.

Accordingly, it is an object of the present invention to provide methods of making new and improved rotor structures so that the rotor structures are usable in a sealed compressor environment wherein a shroud on the end of the rotor will be effective to deflect gases from the end of the rotor shaft, and yet wherein such structure may be readily separated from a press fit shaft without destroying the rotor, shaft, or shroud; and yet wherein the rotor and shroud may be reassembled on the same shaft or a different shaft with the shroud structure performing the same desired deflection function in the subsequently reassembled environment.

Another object of the present invention is to provide a new and improved method of salvaging and re-using shrouded rotors in compressor assemblies; and improved rotor assemblies particularly adapted for use in such methods.

SUMMARY OF THE INVENTION

In carrying out the above and other objects of the present invention in preferred forms thereof, I provide new and improved methods of manufacturing new and improved rotors particularly adapted for use in hermetically sealed motor-compressor units of the type to be utilized for refrigeration applications. In a preferred form, I follow previously known standard manufacturing steps in producing a rotor having counterweights at one end thereof secured to the rotor by any suitable fastening means. Practice of one preferred method provides rotors that include a shroud overlying the counterweights. Methods embodying my invention depart from those previously known primarily in connection with the shroud itself, the location and fastening of the improved shroud to the rotor body, and subsequent operations involving the shroud. More specifically, one preferred method includes punching a shroud to be of a shape and configuration to overlie and be mountable to a rotor. In the manufacture of the shroud itself, I locate a centrally disposed region and define such region by piercing the shroud material along a major portion of its perimeter, but retain at least two tabs or ears which interconnect the centrally disposed portion of the shroud with the remainder of the shroud. The resulting shroud preferably has a centrally disposed portion which then may be separated from the remainder of the shroud by fracturing the interconnecting tabs. Means are provided in the shroud for mounting it to a rotor and the central portion of the shroud which is removable therefrom is preferably dimensioned so that its smallest transverse dimension is at least slightly less than the maximum dimension between any such fastening means. My preferred methods include manufacturing such shroud, locating and weakening the central portion, and assembling the shroud with the rotor structure. A subsequent method embodying the invention involves severing the tabs that originally maintain a unitary structure of the shroud; removing the central portion of the shroud from the rotor structure and thereby exposing the end of a shaft fastened to the rotor.

Thereafter, the rotor is removed from the exposed shaft, and the central portion of the shroud retained. Subsequently, the central portion of the shroud is relocated on the remainder of the shroud, pressed into position, and refastened by any suitable means, such as, but not limited to, spot welds, silver solder, brazing, etc. The rotor having a reassembled shroud then is usable in a compressor.

Improved structures resulting from practicing the invention include a rotor having a shroud attached at one end thereof with a centrally weakened portion of any desired configuration. The preferred configuration of the centrally weakened portion is that of a circular disc, although rectangular, trapezoidal, triangular, square, polygonal, or any other configuration may be used to define the centrally removable portion of the shroud. In all of the structural embodiments of the invention, however, the shroud as originally manufactured is dimensioned and sized to be attached to fastening means (such as rivets or posts for example) provided on a rotor. The shroud is positioned on the end of the rotor such that the weakened and easily removable central portion thereof will overlie the center of the rotor wherein a shaft accommodating bore is provided. The shroud is made of material which is selected to be compatible with a refrigerant atmosphere (for example, well known freon atmospheres); with the shroud material further being chosen so that separated shroud parts may be structurally interconnected again by readily available manufacturing processes. Again, and for purposes of exemplification only, three such processes include brazing, welding, and silver soldering. Since common steel meets the material requirements just mentioned, steel preferably is utilized in the production of shrouds when the present invention is put into practice. However, it is emphasized that other materials also could be used such as aluminum or alloys thereof, brass, and other materials which will be readily apparent to persons having ordinary skill in the art.

The subject matter which is regarded as my invention is particularly pointed out and distinctly claimed in the concluding portion of this specification. The invention itself, however, both as to its organization and mode of operation, together with further objects and advantages thereof, may best be understood by reference to the following description taken in connection with the accompanying drawings.

BRIEF DESCRIPTION OF THE DRAWINGS

FIG. 1 is a side elevation, with parts removed, parts broken away, and parts in phantom of a refrigeration compressor which includes the stator of an electric motor, the rotor of an electric motor, a compressor mechanism (such as a crankshaft and pistons), suitable bearings for the shaft, a housing, a lubricant sump (if desired) and plumbing associated with such compressor for ease of description and in the interest of minimizing the length of the present specification, the parts just mentioned but not illustrated in the drawing, will be readily understood from the drawings contained in the above-referenced patents, the entire contents of which have been incorporated herein by reference;

FIG. 2 is a view taken in the direction of lines 2—2 in FIG. 1;

FIG. 3 is a view of the shroud utilized in the assembly shown in FIGS. 1 and 2;

FIG. 4 is a view taken in the direction of lines 4—4 on FIG. 3;

DESCRIPTION OF THE PREFERRED EMBODIMENTS

Figure 7:
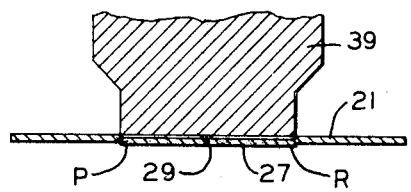
FIGS. 7 and 8 are two views which schematically depict steps which may be followed in the practice of the present invention.

Referring now to FIGS. 1-8 of the drawings, it is to be understood that the structure there shown is to be thought of as being in the environment of a complete compressor assembly such as one shown, for example, in the McCroskey et al patent, Cheers patent, or Hurst patent, all of which have been identified hereinabove and the complete disclosures of which are incorporated herein by reference. However, in the interest of simplifying the structure shown in the attached sheets of drawings, and in the interest of minimizing the length of the present specification, those parts of the compressor assembly which are not necessary for an understanding of the present improvement invention have either been removed or broken away.

Thus, FIG. 1 shows a rotor assembly 10 which includes a laminated rotor core 11 of the common type known in the art which is made up of a plurality of magnetizable laminations 12. As will be understood, the laminations 12 may be made from silicone steel commonly called "lamination grade steel" or from common low carbon iron typically used for making housings of cabinets and so forth. The rotor includes a number of axially extending conductor bars which are interconnected at the ends thereof in a short circuited squirrel cage arrangement by diecast end rings 13, 14. The end rings as well as the conductor bars of the rotor 10 were formed of aluminum in a diecasting cavity. Extending from the end ring 14 are three attachment means shown in the form of elongated rivets 16, 17 and post 18, and a plurality of arcuate steel counterweights 19 are retained on the rivets 16, 17 by being slipped thereover. Subsequently, the shroud 21 is positioned on top of the uppermost weight 19 and set onto the post 18, with the slots 15 and hole 20 in the shroud accommodating the fastening means. Thereafter, the head of post 18 and the heads of rivets 16 and 17 are peened over to retain the shroud in the position shown in FIGS. 1 and 2 and to also retain the weights 19 on the rivet posts 16, 17.

One end of the rotor body is counterbored as indicated at 22 and the central bore 23 of the rotor accommodates a shaft 24. The shaft 24 is press fit into the bore 23 of the rotor body. Upon energization of the stator of the compressor assembly, the rotor assembly 10 rotates relative to bearings which support the shaft 24, and the shaft 24 is operative to drive the compressor mechanism. In the compressor environment, gases that would otherwise impinge on the end 26 of shaft 24 by reason of the gases being directed in the directions generally denoted by the arrows "A", are prevented from reaching the shaft because of the deflective nature of the shroud 21. This prevents the gases from adversely affecting the lubrication system provided by lubricant that is pumped through the shaft.

When it is desired to disassemble the compressor and remove the rotor core 11 from the shaft 24, it is desirable (as described hereinabove) to have access to the end 26 of the shaft 24 in order to press the shaft and rotor body apart.

To facilitate the gaining of access to the end of the shaft 26, the shroud 21 has a central portion 27 thereof (which portion overlies the end 26 of the shaft in the assembly shown in FIG. 1) conditioned to permit the quick and easy removal of the central portion 27 from the remainder of the shroud 21. With the structure illustrated in FIG. 3, the central portion 27 is separated (for example, by being pierced or lanced) from the remainder of the shroud 21 around the complete perimeter of the central portion 27 except for two locations which contain interconnecting ears or tabs 28, 29. The specific dimensions of the ears 28, 29 will vary, depending upon the material selected for use in making the shroud 21, and the thickness of the material from which the shroud is made. However, the dimensions of ears 28, 29 are selected so that the central portion of the shroud will not become separated from the remainder of the shroud during normal operation of the rotor assembly 10 within its refrigeration compressor. On the other hand, the strength of the ears 28 and 29 is sufficiently small that the ears 28, 29 may be fractured with a punch or any other suitable tool to permit removal of the central portion 27 from the remainder of the shroud 21.

In practice, I have found that the central portion 27 of the shroud may be removed from the remainder of the shroud by striking the central portion 27 along the outer periphery thereof at points displaced from the ears 28, 29 by approximately 90°. Alternatively, a punch having a circular working surface with a diameter essentially the same as the diameter of the portion 27 as illustrated in FIG. 3 may be used to remove the central portion 27 from the remainder of the shroud 21. For convenience of reference, the central portion 27 will now and hereinafter be referred to as a shroud plug. However, it is emphasized that the "plug" which is to be easily removed may be of any desired geometrical configuration. For example, it may be generally triangular, generally rectangular, generally square, generally octagonal, hexagonal, trapezoidal, or any other geometric shape desired.

The actual size of the plug is important primarily only from the standpoint that it provide adequate access to the end of the shaft 26 to permit disassembly of the shaft and rotor body when desired. Furthermore, it is desirable that the plug be of a size and dimensioned such that it may be removed from between an end 31 of the balance weights and the post 18 in those applications where the plug is knocked out toward the end of the shaft. This criteria of course is not important if the shroud is inverted from the relationship shown in the drawings and the plug is removed in a direction away from the shaft end. Additionally, it is preferable that the plug be sized so that it will not interfere with removal of the shaft 26 from the rotor body in the event that the plug is knocked out toward the shaft, and is not to be removed from within the interior of the end ring 14 until after the shaft 26 has been removed from the rotor body.

As mentioned hereinabove, the exact dimension of the ears 28, 29 and the configuration thereof may vary depending upon the thickness and strength of the material from which the shroud 21 is made. In actual reductions to practice of the invention common steel was utilized which was 0.89 mm thick (0.035 inches); and the width of the ears 28, 29 as indicated by the dimension "B" in FIG. 3, was 2.39 mm (0.094 inches). In the same reduction to practice just mentioned, the overall diameter of the shroud 21 was nominally 83.82 mm (3.03 inches); and the diameter of the plug 27 was nominally 35.56 mm (1.400 inches) as punched. Moreover, the two ears were substantially equally spaced about the periphery of the plug 27 as best shown in FIG. 3.

At the time that the major portion of the perimeter of the plug 27 was lanced (or pierced), the body of the plug 27 was depressed or made offset relative to the remainder of the shroud 21 as best depicted by FIG. 4. I have found that when steel of the thickness just described and having dimensions as just stated for the shroud 21 is utilized, satisfactory results will be obtained when the plug 27 is pierced and depressed from the plane of the remainder of the shroud 21 so as to have the relative spacing and configuration as illustrated in FIG. 4. FIG. 4 indicates that the plug 27 is depressed from the plane of the remainder of the shroud 21 so that the ears 28, 29 form ramps that lie along a reference angle "C" of 45°. It should be understood that this reference angle may vary from 45°. However, the best mode of practicing the invention as presently contemplated involves the selection of 45° for the reference angle C. When the shroud and plug are formed as indicated by FIGS. 3 and 4, a predetermined fracture line is established along the line represented by the dashed line "F" in FIG. 4. This predetermined fracture line F is located so that a substantially uniform and circular plug 27 will be removed from the remainder of the shroud 21 during the practice of preferred aspects of the invention. Alternate modes of removing the plug are described in detail hereinbelow, but a preferred removal mode involves striking the plug near its periphery with a small punch (alternately on either side of an imaginary line running through the two ears 28, 29) until the ears fracture from the remainder of the shroud.

Figure 5:
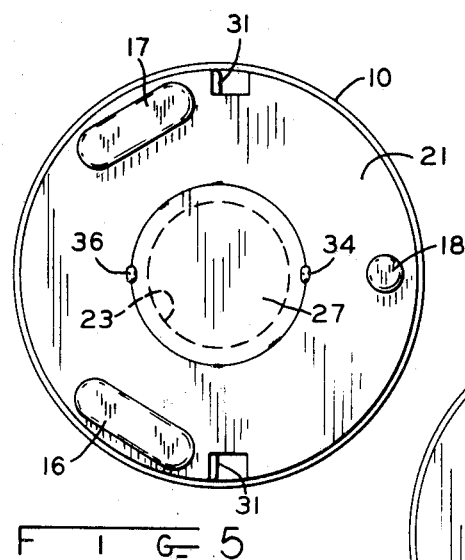
FIG. 5 is a view of a shroud wherein a central portion thereof has been removed and reattached thereto.
Figure 6:
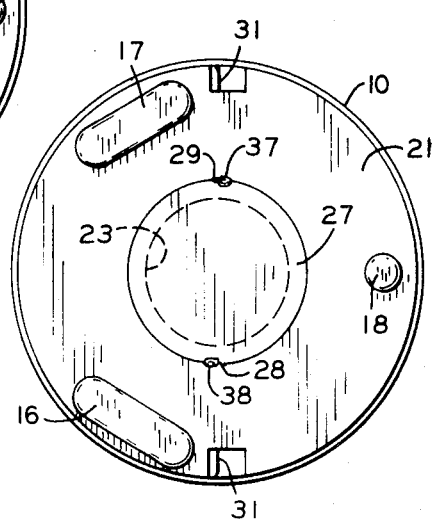
FIG. 6 is a view similar to FIG. 5 but wherein the central portion of the shroud has been oriented in a different position relative thereto prior to reattachment as compared to the relative orientation shown in FIG. 5.

After the plug 27 has been removed from the shroud 21, and the rotor 11 removed from the shaft 24, the rotor body 11 may be reassembled with the shaft 24 or another shaft and utilized in a compressor assembly. When this is done, the plug 27 (regardless of shape) preferably is repositioned within the opening that it was removed from and fastened to the shroud. This procedure may be formed by pressing the plug 27 into the opening from which it was removed, and then silver soldering, brazing, welding, or following any other convenient procedure in order to permanently reestablish the structural integrity of the shroud 21 and thereby reestablish the ability of the shroud to deflect gases from the end of the rotor in a compressor assembly. The positioning of the plug 27 within the shroud 21 is accomplished by repositioning the plug 27 in the opening from whence it came with whatever relative orientation to the shroud 21 that is convenient for the person performing the reassembly procedure. For example, the plug 27 may be repositioned as illustrated in FIG. 5 with the fractured portions of the ears (identified at 28, 29 in FIG. 3) relatively misaligned; or the plug 27 may be repositioned as illustrated in FIG. 6 with the fractured portions of the ears 28, 29 realigned one with another. Moreover, silver solder may be used to secure the plug 27 in place by being applied as denoted at 34, 36 in FIG. 5, or by being applied as denoted at 37, 38 in FIG. 6.

Press fitting of the rotor body and shaft may be accomplished, as will be understood, by thermally shrinking the rotor on a shaft (which is preferred) or by pressing the rotor and shaft together with a mechanical interference fit.

Figure 8:
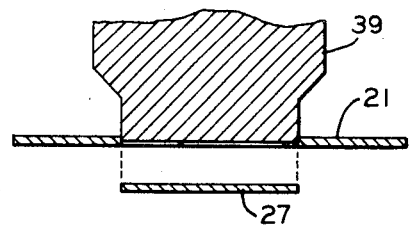

FIGS. 7 and 8 depict alternate steps and procedures which may be followed when practicing the present invention. For example, rather then using a relatively small diameter punch (for example a punch approximately 6 mm or one-quarter of an inch in diameter) to tap the plug and remove it from the shroud, a punch having a peripheral configuration of the plug 27 may be used as indicated by the special punch 39. At the time that the rotor body 11 is to be removed from the shaft 24, the punch 39 will be moved into engagement with the plug 27 and then tapped with a suitable tool, such as a hammer, so as to remove the plug 27 from the remainder of the shroud 21.

After the tool 39 has been driven downwardly as indicated in FIG. 8, the plug 27 is fractured from the shroud 21 and thereupon access to the end of the shaft 24 is provided through the aperture that is established by removal of the plug 27. While the procedure illustrated by FIGS. 7 and 8 may be used, it is preferred that the plug be removed by using a punch that will concentrate the force applied at the perimeter of the plug. Moreover, it is preferred to concentrate such force at the periphery of the plug on one side of an imaginary line L (see FIG. 3) that is parallel to the plane of the shroud and that passes through two tabs. Preferably, a punch with a diameter of from 3 mm to 19 mm (0.125 to 0.75 inches) would be used; and the preferred procedure would be to drive the punch on one side of the imaginary line (e.g., at the region P in FIG. 3) so as to cause twisting movement of the plug about an axis generally co-axial with the imaginary line L. Then the punch would be driven on the opposite side of the line (see region R in FIG. 3) to cause a reverse twisting action. This procedure then would be repeated until the tabs 28, 29 fatigued and fractured along the predetermined fracture lines.

It will now be understood that I have described herein a new and improved method of making new and improved rotor assemblies for hermetically sealed compressors; and new and improved methods of salvaging rotors and shafts from compressor assemblies.

After a plug (such as the plug 27) is reassembled with a shroud such as the shroud 21, the integrity of the shroud 21 (from a structural standpoint) is essentially the same as it was at the time of original manufacture. Thus, it will be understood that rotor assemblies having shrouds as described herein will be provided with shrouds that provide a reinforcing effect for the counterweights attached to an end of the rotor and which will establish baffle means to protect the end of the shaft from refrigerant gases both at the time of initial manufacture, and after a salvaging procedure has been performed.

It has been noted hereinabove that the shape of the plug 27 is not critical, however, it is noted that the shape and/or size of the plug 27 preferably should be selected so that removal and subsequent reassembly of the plug will not contribute (after reassembly) to objectionable unbalance of the rotor assembly.

If the plug is trapezoidal in shape, it will necessarily be reinserted in the same relative orientation to the remainder of shroud as existed at the time of original manufacture of the shroud. On the other hand, if the plug were to be in the form of an equilateral triangle, misorientation of the plug relative to the remainder of the shroud at the time of reassembly would not result in undesirable unbalancing of the shroud and rotor assembly. Thus, it will be understood that the nature of the embodiments disclosed and described herein is such that the possibility of introducing objectionable imbalances into a salvaged rotor body because of disassembly and reassembly is not likely to occur as a result of inadvertence or mistake. Moreover, since the material forming the plug is lanced from the remainder of the shroud at the time of original manufacture, the dimensional tolerances between the plug and the hole from which it is ultimately removed will be exceedingly small and in most (if not in fact all) cases the material forming the plug 27 will be most readily reinsertable into the shroud 21 in substantially the same relative orientation that existed at the time of original manufacture. This is desirable from the standpoint that the opportunity for vibration and associated cyclical stressing of welds, solder locations, or other attaching means at the interface of the reassembled plug and shroud will not lead to premature failure of such attaching means and separation of the plug from the shroud. On the other hand, if the shroud were formed with a hole in it at the time of original manufacture and then supplied with a separate closure plug as originally suggested by others in the art prior to the present invention, vibration, premature separation of the closure member and shroud, and potentially undesirable noise, wear, or unbalance would probably result.

Similarly, other prior suggestions such as those that would involve manufacturing a solid shroud which would have a shaft access aperture cut therein only at the time of intended disassembly of the rotor from the shaft would lead to objectionable problems in reclosing the shaft admitting aperture at the time of reassembly. Such problems would be associated with objectionable unbalance and vibrations.

By following the present invention, a tightly fitting plug will be provided in any event. More specifically, the stamping or punching operation which lances the periphery of the plug will introduce strains into the plug and also in the remainder of the shroud at the lanced or pierced interface. Then, when the plug is knocked out, the stressed material at the lanced locations will relax, causing an expansion (even though it may be slight) of the plug size. Similarly, the aperture in the remainder of the shroud will be somewhat slightly diminished. This punching stress that causes this effect insures that the plug is a tight and vibration free part of the shroud when originally manufactured. On the other hand, relaxation of the stress upon knockout and the associated dimensional changes, insures that a tight fitting vibration preventing plug/shroud relationship will exist after reassembly.

While presently preferred embodiments of the present invention have been described herein in the context of the best mode presently contemplated for practicing the invention, other forms of the invention may be utilized, all as will be readily apparent to persons of ordinary skill in the art. Moreover, it will be readily apparent to those skilled in the art that changes and modifications may be made without departing from the invention. It is therefore intended in the appended claims to cover all such changes and modifications that fall within the spirit and scope of the invention.

What I claim as new and desire to secure by Letters Patent of the United States is:

1. A method of manufacturing a rotor assembly comprising a laminated rotor body having a centrally locating bore, electrically conductive members, balance weights, and a shroud overlying the balance weights and the bore, said method comprising the steps of: fabricating a shroud by locating a central knockout plug, separating the central knockout plug from the remainder of the shroud around a major portion of the perimeter of the knockout plug and defining fracture lines along at least two tabs that interconnect the knockout plug with the remainder of the shroud, assembling at least one counterweight with the rotor body; positioning the shroud over the at least one counterweight; interconnecting the parts so assembled by fastening the shroud, at least one counterweight, and remainder of the rotor assembly with attaching means while the knockout plug is positioned in substantially collinear relationship with the bore of the rotor; mounting the rotor assembly on a shaft, and subsequently separating the knockout plug from the shroud by severing said tabs, thereby providing a hole for access to the shaft; utilizing such hole for access while pressing the rotor assembly and shaft apart by engaging an end of the shaft through such hole; and subsequently replacing said knockout plug in such hole.

2. The method of claim 1 wherein the plug is strained against the remainder of the shroud around the periphery of the plug where it is separated from the remainder of the shroud.

3. The method of claim 1 wherein the plug is offset from the plane of the remainder of the shroud, and wherein positioning the shroud comprises locating the offset plug on the side of the remainder of the shroud facing the rotor body.

* * * * *

UNITED STATES PATENT AND TRADEMARK OFFICE
CERTIFICATE OF CORRECTION

PATENT NO. : 4,388,756
DATED : June 21, 1983
INVENTOR(S) : Richard D. Burns

It is certified that error appears in the above—identified patent and that said Letters Patent is hereby corrected as shown below:

Claim 1, lines 27-28, "locating" should be --located--.

Signed and Sealed this

Sixth Day of November 1984

[SEAL]

Attest:

GERALD J. MOSSINGHOFF

Attesting Officer     Commissioner of Patents and Trademarks